Figure 1:
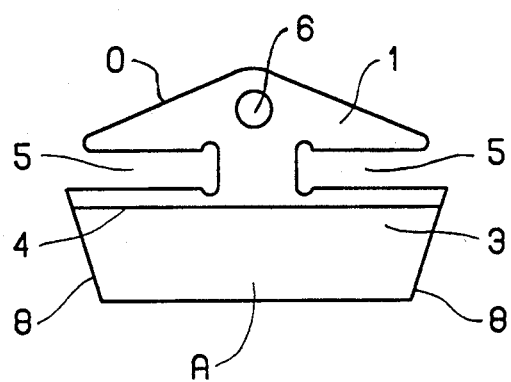

United States Patent van Liempd

[11] Patent Number: 5,263,904
[45] Date of Patent: Nov. 23, 1993

[54] TRANSVERSE ELEMENT FOR A DRIVING BELT

[75] Inventor: Jeroen H. van Liempd, Breda, Netherlands

[73] Assignee: Van Doorne's Transmissie B.V., Tilburg, Netherlands

[21] Appl. No.: 910,819

[22] Filed: Jul. 9, 1992

[30] Foreign Application Priority Data

Jul. 11, 1991 [NL] Netherlands .................. 9101218

[51] Int. Cl.⁵ .............................................. F16G 1/22
[52] U.S. Cl. .................................................... 474/242
[58] Field of Search ........ 474/201, 237, 240, 242–245, 474/265

[56] References Cited

U.S. PATENT DOCUMENTS

| 4,281,483 | 4/1981 | Horowitz et al. | |
| 4,427,401 | 1/1984 | Hendriks et al. | 474/242 |
| 4,894,049 | 1/1990 | Koppelaars | 474/242 |
| 4,968,288 | 1/1990 | LeCouturier et al. | 474/242 |
| 4,976,663 | 12/1990 | Hendrikus | 474/242 |

FOREIGN PATENT DOCUMENTS 60-53246  8/1985  Japan .
2013116A 8/1979  United Kingdom .

Primary Examiner—Thuy M. Bui
Attorney, Agent, or Firm—Pennie & Edmonds

[57] ABSTRACT

If, in the case of a transverse element for application in a driving belt for use in a continuously variable transmission, the thickness of the transverse element is indicated by d, and the area of a principal face of the transverse element is indicated by A, and the circumference of the principal face is indicated by O, then the parallelism of the transverse element remains optimally conserved if the formulated condition hereunder is satisfied. As a result of this measure, noise and vibration during operation are decreased and the efficiency is improved.

$$Od/A < 2.0$$

7 Claims, 1 Drawing Sheet

TRANSVERSE ELEMENT FOR A DRIVING BELT

The invention concerns a driving belt which consists of at least one endless belt on which transverse elements are mounted so as to be translatable and such that neighbouring principal faces of the elements lie against each other, which element possesses a thickness d when a principal face possesses an area A and a circumference O.

Moreover, the invention concerns a transverse element for application in a driving belt, and also concerns a continuously variable transmission provided with a driving belt.

Such a driving belt and such a transverse element, which receive application in a continuously variable transmission, are generally known. In a continuously variable transmission, the transmission ratio is changed by influencing the running-radii of a driving belt which moves between conical discs of a primary and a secondary pulley, the change being effected by controllable means which are usually hydraulic. After having traversed an initially straight section, the driving belt traverses a curved section, at the start of which the consecutive transverse elements, while undergoing a tilting movement, are clamped between the pulley-discs, so as to subsequently traverse the ensuing curved section in a tilted position. Upon leaving the pulleys, the consecutive transverse elements tilt back to their original positions, whereby the principal faces of the neighbouring transverse elements join up again.

It will be obvious from the preceding elucidation that, in transferring force by means of a continuously variable transmission, the rotational motion of the transverse element results in its being subjected to a multiplicity of loads of variable magnitudes and directions, whereby variable forces are exerted on the principal planes and the side planes. The complex, variable, three-dimensional loads associated herewith lead to problems such as deformation of the transverse elements, vibration and noise. In particular, the deformations which occur during operation of the driving belt result in stringent demands being made on the parallelism of (in particular) the principal faces of the transverse element during production. An attempt has been made to meet this demand by subjecting each transverse element to an extra calibration-process. However, this results in increased costs.

The present invention aims at providing an economical solution of the problems of deformation, vibration and noise without necessitating application of the extra process.

To this end, the transverse element according to the invention possesses the characteristic that its geometry is such that the quotient of O × d and A is smaller than 2.0.

The advantage of the driving belt according to the invention is that this simple geometrical prescription provides a development-condition for driving belts which makes it possible to achieve sufficient parallelism between principal faces of the transverse element and to sufficiently maintain this parallelism during operation, despite the complex loads which arise during operation. The geometry is thereby optimal in relation to the occurring complex load. In addition, operation of the continuously variable transmission with the driving belt according to the invention leads to a marked reduction of associated vibrations and disturbing auditory load. Moreover, the efficiency of the transmission appears to be improved by application of the driving belt according to the invention.

A preferential embodiment of a driving belt according to the invention is characterised by the fact that the geometry of the transverse element is such that the quotient of O × d and A is smaller that 4/3.

Figure 2:
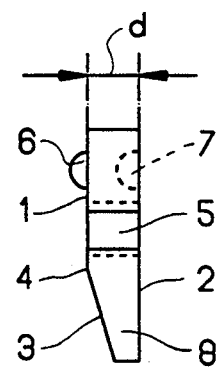

The invention shall be further elucidated using the accompanying drawing, in which similar elements in the various figures are provided with the same reference numbers. Depicted in the figures are:

In FIG. 1: a front elevation of a transverse element according to the invention (not to scale); and In FIG. 2: a right-end view of the transverse element of FIG. 1.

The views in FIGS. 1 and 2 depict a transverse element which possesses principal faces 1 and 2. In this case, principal face 1 is provided with a bevelled section 3 which is located under a tilting line 4. The transverse element shown in the depicted preferential embodiment is provided with a gap 5 for receipt of at least one endless metal belt (not depicted). Above the tilting line 4 are mounted means in the form of a protrusion 6 on the principal face 1 and a corresponding recess 7 in the principal face 2, which means are not necessarily for the purpose of coupling or centering. The transverse element has an essentially trapezoidal transverse cross-section, and possesses two side planes 8 which, upon mounting the transverse element in the driving belt and in a presumably familiar continuously variable transmission, come into contact with the conical pulleys of the transmission.

If the area of a principal face is represented by A, the circumference of the same face by O, and the thickness of the transverse element by d, then the geometry of the transverse element is required to satisfy the condition:

$$Od/A < 2.0$$

In that case, a parallelism of the transverse element is obtained, and can be sufficiently maintained during operation, despite the complex loads which arise during operation. Noise and vibration are thereby reduced, and the efficiency increases.

I claim:

1. Driving belt comprising at least one endless belt on which transverse elements are mounted so as to be translatable and so that neighbouring principal faces of the elements lie against each other, which transverse element possesses a thickness d when the principal face possesses an area A and a circumference O, possessing the characteristic that the geometry of the transverse element is such that the quotient of O × d and A is smaller than 2.0.

2. Driving belt according to claim 1, characterised in that the geometry of the transverse element is such that the quotient of O × d and A is smaller that 4/3.

3. Transverse element which can be applied in a driving belt according to claim 1 or 2.

4. Continuously variable transmission provided with a driving belt according to one of the claims 1 or 2.

5. In a driving belt comprising at least one endless belt on which transverse elements are mounted so as to be translatable and so that neighboring principal faces of the elements lie against each other, the improvement wherein each transverse element has a maximum thickness d and a principal face with an area A and a circumference O, where the quotient of O × d and A is smaller than 2.0.

6. The improvement in the driving belt according to claim 5 wherein the principal face is one of two opposite faces of the element and includes a first section extending parallel to the opposite face and a second bevelled section disposed at an angle to the opposite face.

7. The improvement in the driving belt according to claim 6 wherein the thickness d is a measurement of the thickness between the first section of the principal face and the opposite face.

* * * * *